Dec. 27, 1938. K. E. PORTER 2,141,822
COOKING UTNSIL
Filed Jan. 6, 1938
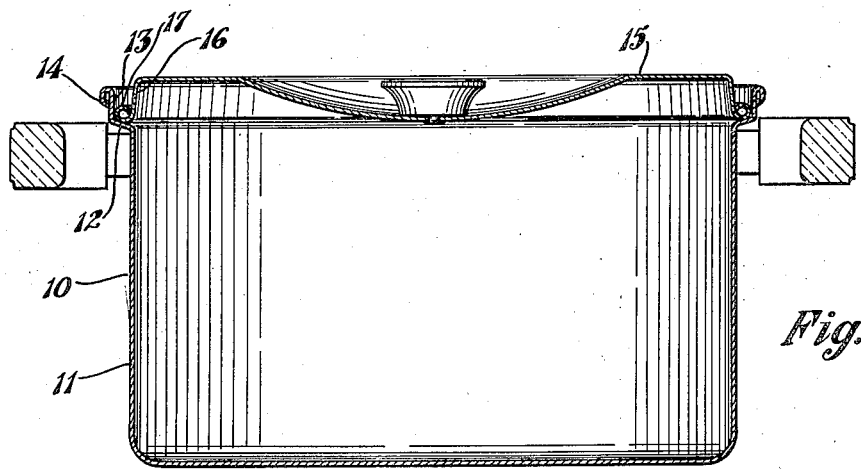
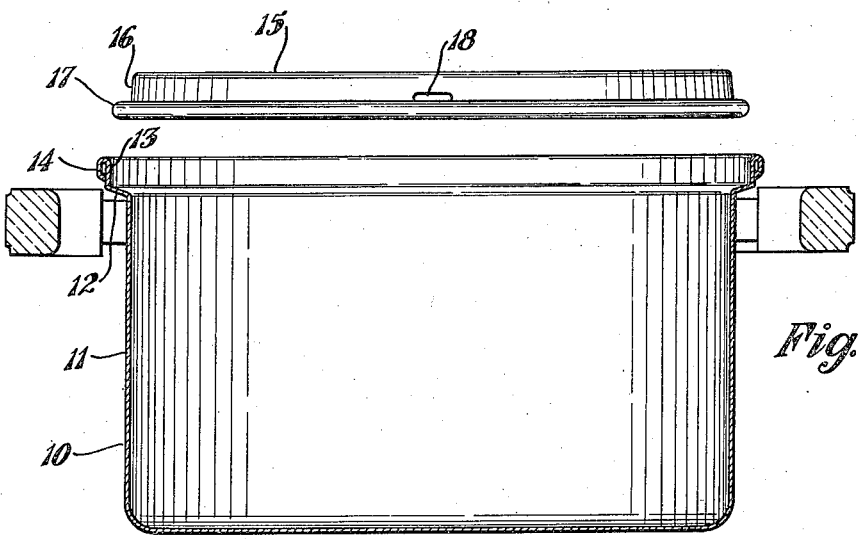
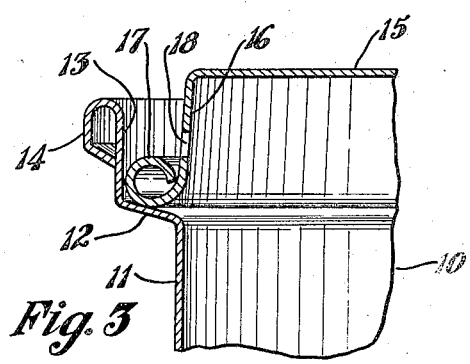
Inventor
Kirk E. Porter Patented Dec. 27, 1938

2,141,822

UNITED STATES PATENT OFFICE 2,141,822

COOKING UTENSIL

Kirk E. Porter, Wooster, Ohio, assignor to The Buckeye Aluminum Company, Wooster, Ohio, a corporation of Ohio Application January 6, 1938, Serial No. 183,653

5 Claims. (Cl. 53—8)

The invention relates to improvements in cooking utensils, more particularly to that type of cooking utensil in which the cover is adapted to seat within an off-set peripheral flange surrounding the rim of the utensil, and the present improvement is directed more especially to features of the cover fit.

There are two styles of cover fit now in common use upon this general type of cooking utensil, commonly known as the flat seal and the vapo-seal. In the former a flat, horizontal shoulder extends outward around the rim of the utensil and is surrounded by an upstanding peripheral flange, and the cover is provided with a depending annular flange of considerably greater diameter than the utensil, and adapted to rest upon said shoulder. The flange of the cover being of greater diametrical dimension than the wall of the utensil permits condensation draining from the cover to rest upon said flat shoulder.

In the so-called vapo-seal type of cover fit, the construction is substantially the same as above described except that the shoulder surrounding the rim portion of the utensil is provided with an annular groove for collecting the condensation from the depending flange of the cover. Since the flange of the cover is of greater diametrical dimension than the wall of the utensil the condensation draining from the cover collects in the groove.

In both of these types of cover fit the liquids collecting upon the shoulder will sometimes bubble out over the rim of the utensil. It has also been found that these types of cover fits frequently cause vacuumatic action when the cooked food in the utensil is cooling, causing the cover to become tight upon the utensil. This happens especially when cooking foods with excessive shrinkage.

Utensils of this type are usually provided with a valve in the top of the cover for preventing excessive steam pressure within the utensil. This valve cannot be readily cleaned, and unless thoroughly cleaned after each use of the utensil is not, of course, sanitary. The annular groove in the shoulder of the so-called vapo-seal type is not as readily cleaned as a flat surface.

The object of the present improvement is to provide a cover fit for cooking utensils which overcomes the disadvantages of the present type of cover fits, being so constructed that condensation from the cover will not drain upon the shoulder of the utensil upon which the cover flange rests, and being so constructed that any steam which escapes through the cover vent or under the cover rim and condenses will return to the inside of the utensil, thus preventing any food juices or water collecting upon the shoulder and bubbling over the top of the utensil.

The above objects together with others which will be apparent from the drawing and following description, or which may be later referred to may be attained by providing a downwardly and inwardly inclined annular shoulder around the rim portion of the utensil located at the proper angle to prevent the collection of liquids thereon and to cause any liquid deposited thereon to immediately drain into the utensil; the depending rim flange of the cover being of substantially the same diametrical dimension as the wall of the utensil so that condensation from the cover will drain directly into the utensil without being deposited upon the shoulder.

The invention further contemplates the provision of a steam vent in the form of a small aperture located in the depending flange of the cover at a point considerably below the top of the upstanding flange surrounding the shoulder on the utensil whereby steam escaping through said vent will strike said upstanding flange, thus preventing the steam from escaping in a straight horizontal direction and obviating the possibility of steam and food juices from striking adjoining utensils upon the range, the wall adjacent to the range, and the hands or arms of a person working in the vicinity of the utensil.

An embodiment of the invention thus briefly described is illustrated in the accompanying drawing in which Figure 1 is a vertical sectional view through a cooking utensil provided with the improved cover fit, the cover being shown in closed position thereon;

Fig. 2, a vertical sectional view through the utensil with the cover raised from the same; and Fig. 3, an enlarged detail sectional view of the improved cover fit.

Similar numerals refer to corresponding parts throughout the drawing.

The utensil indicated generally at 10 may be formed of sheet metal or other suitable material and the side wall 11 thereof is preferably substantially vertical. A downwardly and inwardly inclined annular shoulder 12 surrounds the upper end of the side wall 11 and is located at such an angle that liquid deposited thereon will immediately drain into the interior of the utensil.

An upstanding rim flange 13 is located at the upper end of the annular flange 12 and, if desired, may be finished with any suitable bead such as indicated at 14.

The cover 15 is provided around its periphery with the depending annular flange 16 which is of substantially the same diametrical dimension as the side wall 11 of the utensil. Thus, any condensation draining down the inside of the depending flange 16 will pass directly into the inside of the utensil and will not be deposited upon the shoulder 12 upon which the bead 17 at the lower edge of the flange 16 is adapted to rest as shown in Figs. 1 and 3.

A vent hole 18 is provided in the depending flange 16 of the cover at a point just above the bead 17 so that steam escaping through said vent hole will strike the upstanding flange 13 and as it condenses the liquid will drain under the bead 17 down the inclined shoulder 12 and be returned to the inside of the utensil.

This construction prevents the escaping steam from coming into contact with other utensils upon the range or the wall adjacent to the range or the hands or arms of a person working at or near the range.

From the above it will be seen that there can be no collection of liquids upon the shoulder 12 since all of the condensation from the cover will drain directly back into the utensil without striking the shoulder 12, while any condensation from steam escaping through the vent hole 18 will immediately drain back into the utensil and can not collect upon the shoulder 12.

The construction of the utensil with the sharply inclined shoulder 12 and the upstanding flange or wall 13 tends to cause the steam which does escape through the vent hole or under the rim bead of the cover to condense and return to the inside of the utensil.

The vent hole is more sanitary and more easily cleaned than the usual valve in the top of the cover and this vent provides safety by allowing the escape of internal pressures, particularly when one utensil is stacked on top of another in the oven or on top of the range.

This type of vent hole also prevents any vacuumatic action inside of the utensil when the cooked food is cooling, thus preventing the cover from becoming tight upon the top of the pan by vacuum when the cooked food has cooled.

I claim:
1. A cooking utensil having side walls provided with an annular shoulder at the upper end of the side walls, an upstanding peripheral flange rising from said shoulder, and a cover having a depending rim flange adapted to seat upon said shoulder and provided with a vent hole below the top of said upstanding peripheral flange.

2. A cooking utensil having side walls provided with an annular, downwardly and inwardly inclined shoulder at the upper end of the side walls, said shoulder being inclined at such an angle that liquids will immediately drain therefrom into the utensil, an upstanding peripheral flange rising from said shoulder, and a cover having a depending rim flange of substantially the same diametrical dimensions as said side walls adapted to seat upon said shoulder and provided with a vent hole below the top of said upstanding peripheral flange.

3. A cooking utensil having side walls provided with an annular, downwardly and inwardly inclined shoulder at the upper end of the side walls, an upstanding peripheral flange rising from said shoulder, and a cover having a depending rim flange provided at its lower end with an out-turned bead adapted to seat upon said shoulder and provided with a vent hole below the top of said upstanding peripheral flange.

4. A cooking utensil having side walls provided with an annular, downwardly and inwardly inclined shoulder at the upper end of the side walls, an upstanding peripheral flange rising from said shoulder, a cover having a depending rim flange adapted to seat upon said shoulder and provided with a vent hole in the cover flange below the top of said upstanding flange.

5. A cooking utensil having side walls provided with an annular, downwardly and inwardly inclined shoulder at the upper end of the side walls, said shoulder being inclined at such an angle that liquid will immediately drain therefrom into the utensil, an upstanding peripheral flange rising from said shoulder, and a cover having a depending rim flange of substantially the same diametrical dimension as said side walls and provided at its lower end with an out-turned bead adapted to seat upon said shoulder, there being a vent hole in the cover flange just above said bead.

KIRK E. PORTER.